(12) United States Patent
Sugino

(10) Patent No.: US 8,894,525 B2
(45) Date of Patent: Nov. 25, 2014

(54) HYBRID VEHICLE DRIVING SYSTEM

(75) Inventor: Soichi Sugino, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/642,322

(22) PCT Filed: Apr. 15, 2011

(86) PCT No.: PCT/JP2011/059348
§ 371 (c)(1),
(2), (4) Date: Oct. 19, 2012

(87) PCT Pub. No.: WO2011/138892
PCT Pub. Date: Nov. 10, 2011

(65) Prior Publication Data
US 2013/0040773 A1    Feb. 14, 2013

(30) Foreign Application Priority Data

May 7, 2010   (JP) ................................. 2010-106937

(51) Int. Cl.
*F16H 3/72* (2006.01)
*B60K 6/365* (2007.10)
*B60K 6/442* (2007.10)
*B60K 6/48* (2007.10)
*F16H 37/10* (2006.01)

(52) U.S. Cl.
CPC ......... *B60K 6/442* (2013.01); *B60K 2006/4833* (2013.01); *F16H 2200/2007* (2013.01); *Y02T 10/6234* (2013.01); *B60K 6/365* (2013.01); *F16H 2200/2097* (2013.01); *F16H 2200/2035* (2013.01); *F16H 2037/101* (2013.01); *Y10S 903/91* (2013.01)
USPC .............................................. 475/5; 903/910

(58) Field of Classification Search
CPC ........................................................ F16H 3/72
USPC .......................................... 475/1–5; 903/910
See application file for complete search history.

(56) References Cited

U.S. PATENT DOCUMENTS 1,980,165 A    11/1934  Burleigh
5,603,671 A *  2/1997  Schmidt ............................. 475/5
(Continued)

FOREIGN PATENT DOCUMENTS

DE    102005049992 A1   4/2007
JP         2942533 B2    8/1999
(Continued)

OTHER PUBLICATIONS

International Search Report of PCT/JP2011/059348, mailing date Jul. 12, 2011.

(Continued)

*Primary Examiner* — Troy Chambers
*Assistant Examiner* — Lillian Nguyen
(74) *Attorney, Agent, or Firm* — Westerman, Hattori, Daniels & Adrian, LLP

(57) ABSTRACT

In a driving apparatus for a hybrid vehicle having an internal combustion engine and first and second electric rotating machines, it is configured to have a speed increasing mechanism that increases speed of an output of the engine inputted through an input shaft and transmits it to the first electric rotating machine; a speed reducing mechanism that reduces speed of an output of the second electric rotating machine and transmits it to an output shaft; a first clutch adapted to connect and disconnect a first driving force transmission path coupling the speed increasing mechanism and the output shaft; and a second clutch adapted to connect and disconnect a second driving force transmission path coupling the engine and the output shaft.

4 Claims, 4 Drawing Sheets

(56) References Cited

U.S. PATENT DOCUMENTS

| | | | |
|---|---|---|---|
| 6,059,059 A | 5/2000 | Schmidt-Brucken | |
| 7,252,613 B2* | 8/2007 | Bucknor et al. | 475/5 |
| 7,288,041 B2* | 10/2007 | Bucknor et al. | 475/151 |
| 7,294,079 B2* | 11/2007 | Raghavan et al. | 475/5 |
| 7,559,864 B2* | 7/2009 | Maeda et al. | 475/5 |
| 7,833,119 B2* | 11/2010 | Klemen et al. | 475/5 |
| 2006/0189427 A1* | 8/2006 | Raghavan et al. | 475/5 |
| 2007/0072724 A1* | 3/2007 | Raghavan et al. | 475/5 |
| 2007/0105678 A1* | 5/2007 | Bucknor et al. | 475/5 |
| 2007/0284176 A1* | 12/2007 | Sah et al. | 180/305 |
| 2008/0045365 A1* | 2/2008 | Usoro | 475/5 |
| 2010/0029428 A1* | 2/2010 | Abe et al. | 475/5 |
| 2010/0227723 A1* | 9/2010 | Seo et al. | 475/5 |
| 2011/0256974 A1* | 10/2011 | Okuwaki | 475/5 |

FOREIGN PATENT DOCUMENTS

| | | |
|---|---|---|
| JP | 2004-003549 A | 1/2004 |
| JP | 2007-099016 A | 4/2007 |
| JP | 2008-120315 A | 5/2008 |
| JP | 2010-052518 A | 3/2010 |
| JP | 2010-071448 A | 4/2010 |
| JP | 2010-125899 A | 6/2010 |

OTHER PUBLICATIONS

Extended European Search Report dated Nov. 5, 2013, issued in corresponding European Patent Application No. 11777411.7 (5 pages).

Japanese Office Action dated May 7, 2014, issued in corresponding application No. 2012-513782, with English translation. (5 pages).

* cited by examiner

|  | 2ND CLUTCH | 1ST CLUTCH | OA RATIO |
|---|---|---|---|
| SERIES HYBRID MODE | X | X | 8.04 (2ND ROTATING MACHINE) |
| ENGINE DIRECTLY-CONNECTED LOW MODE | O | X | 3.01 (ENGINE) |
| ENGINE DIRECTLY-CONNECTED HIGH MODE | X | O | 2.26 (ENGINE) |

O : ON
X : OFF

HYBRID VEHICLE DRIVING SYSTEM

TECHNICAL FIELD

Embodiments of the invention relate to a hybrid vehicle driving apparatus, particularly to a hybrid vehicle driving apparatus that can be reduced in weight and size.

BACKGROUND ART

As a technique for a hybrid vehicle driving apparatus, a patent reference 1 is known. The technique made on the basis of a series-hybrid mode has two clutches and is configured to transmit driving force of either an internal combustion engine or an electric rotating machine through the clutches.

PRIOR ART REFERENCE

Patent Reference

Patent Reference 1: Japanese Patent No. 2942533

SUMMARY OF INVENTION

Problems to be Solved by the Invention

The patent reference 1 configured as above is directed to improvement in fuel efficiency at high-speed running. However, since only one gear ratio is provided for converting the engine speed to the driving force and setting of the gear ratio depends on running performance of the vehicle, e.g., the maximum vehicle speed, it is not necessarily sufficient in terms of improvement in fuel efficiency.

The object of this invention is therefore to overcome this problem by providing a driving apparatus for a hybrid vehicle having an internal combustion engine and first and second electric rotating machines, which apparatus has at least two gear ratios, thereby further enhancing fuel efficiency.

Means for Solving the Problems

In order to achieve the object, as recited in claim 1, this invention is configured to have an apparatus for driving a hybrid vehicle having an internal combustion engine and first and second electric rotating machines, comprising: a speed increasing mechanism adapted to increase speed of an output of the engine inputted through an input shaft and transmit the output to the first electric rotating machine; a speed reducing mechanism adapted to reduce speed of an output of the second electric rotating machine and transmit the output to an output shaft; a first clutch adapted to connect and disconnect a first driving force transmission path coupling the speed increasing mechanism and the output shaft; and a second clutch adapted to connect and disconnect a second driving force transmission path coupling the engine and the output shaft.

As described below, in the apparatus according to claim 2, each of the speed increasing mechanism and the speed reducing mechanism comprises a planetary gear mechanism and installed in an inner periphery of each of the first electric rotating machine and the second electric rotating machine.

As described below, in the apparatus according to claim 3, the second electric rotating machine is placed adjacent to the engine with the speed reducing mechanism installed at its inner periphery, while the first electric rotating machine is placed adjacent to the second electric rotating machine on a side far from the engine with the speed increasing mechanism installed at its inner periphery.

As described below, in the apparatus according to claim 4, the speed increasing mechanism has a carrier connected to the engine, a sun gear connected to a housing and a ring gear connected to the first driving force transmission path, while the speed reducing mechanism has a sun gear connected to the second electric rotating machine, a ring gear connected to the housing and a carrier connected to the second output shaft, whereby the ring gear of the speed increasing mechanism and the carrier of the speed reducing mechanism are connected through the first clutch.

As described below, in the apparatus according to claim 5, the output of the engine is inputted through the input shaft and the first and second clutches are supplied with pressing force from exterior of the input shaft.

Effects of the Invention

In a hybrid vehicle driving apparatus according to claim 1, it is configured to have a speed increasing mechanism adapted to increase speed of an output of the engine inputted through an input shaft and transmit the output to the first electric rotating machine; a speed reducing mechanism adapted to reduce speed of an output of the second electric rotating machine and transmit the output to an output shaft; a first clutch adapted to connect and disconnect a first driving force transmission path coupling the speed increasing mechanism and the output shaft; and a second clutch adapted to connect and disconnect a second driving force transmission path coupling the engine and the output shaft. The gear ratio can be changed between two ratios through the first and second clutches so that the engine output can be converted to more appropriate driving force in accordance with the condition. Consequently, when the vehicle runs with the engine output, options of a series/parallel running mode that enables the vehicle to run with smaller loss in electric power than a series-hybrid running (in which the engine output is converted to electric energy and the converted energy is again converted to the driving force) can be increased. As a result, it becomes possible to enhance fuel efficiency of the engine.

Further, since the speed increasing mechanism increasing the output of the engine in speed and transmit it to the first electric rotating machine is provided, it becomes possible to make the first electric rotating machine light and compact. Furthermore, since the first clutch connecting and disconnecting the first driving force transmission path is provided, the rotation of the engine in the high speed range can be suppressed, thereby further enhancing fuel efficiency.

In the apparatus according to claim 2, each of the speed increasing mechanism and the speed reducing mechanism comprises a planetary gear mechanism and installed in an inner periphery of each of the first electric rotating machine and the second electric rotating machine. With this, in addition to the above effects, it becomes possible to make the apparatus further lighter and more compact.

In the apparatus according to claim 3, the second electric rotating machine is placed adjacent to the engine with the speed reducing mechanism installed at its inner periphery, while the first electric rotating machine is placed adjacent to the second electric rotating machine on a side far from the engine with the speed increasing mechanism installed at its inner periphery. Consequently, the side far from the engine can be smaller than the engine side, i.e., the apparatus is shaped like an artillery shell. With this, in addition to the above effects, it becomes possible to improve the mountability of the apparatus on the vehicle.

In the apparatus according to claim 4, the speed increasing mechanism has a carrier connected to the engine, a sun gear connected to a housing and a ring gear connected to the first driving force transmission path, while the speed reducing mechanism has a sun gear connected to the second electric rotating machine, a ring gear connected to the housing and a carrier connected to the output shaft, whereby the ring gear of the speed increasing mechanism and the carrier of the speed reducing mechanism are connected through the first clutch. Since the first and second electric rotating machines, speed increasing mechanism, speed reducing mechanism and first and second clutches can be arranged coaxially with the input shaft that transmits the input from the engine to the carrier of the speed increasing mechanism, in addition to the above effects, it becomes possible to shorten the length in the axial direction.

In the apparatus according to claim 5, the output of the engine is inputted through the input shaft and the first and second clutches are supplied with pressing force from exterior of the input shaft. With this, in addition to the above effects, it becomes possible to further enhance fuel efficiency of the engine.

To be more specific, pressing force of this kind of clutch is generally generated with the use of pressure (hydraulic pressure) of operating oil supplied from the shaft center of the input shaft. In such configuration, since the operating oil is consumed at the hydraulic passage (such as leakage at a seal ring, etc.) and it means that wasted energy exists at a hydraulic pump, it deteriorates fuel efficiency.

However, since it is configured to supply pressing force to the clutches from the exterior of the input shaft, it becomes possible to reduce consumption of the operating oil, in other words, to employ the structure not using hydraulic pressure. Therefore, fuel efficiency of the engine can be further enhanced.

DESCRIPTION OF EMBODIMENTS

Embodiments for carrying out a hybrid vehicle driving apparatus according to the present invention will now be explained with reference to the attached drawings.

First Embodiment

Figure 1:
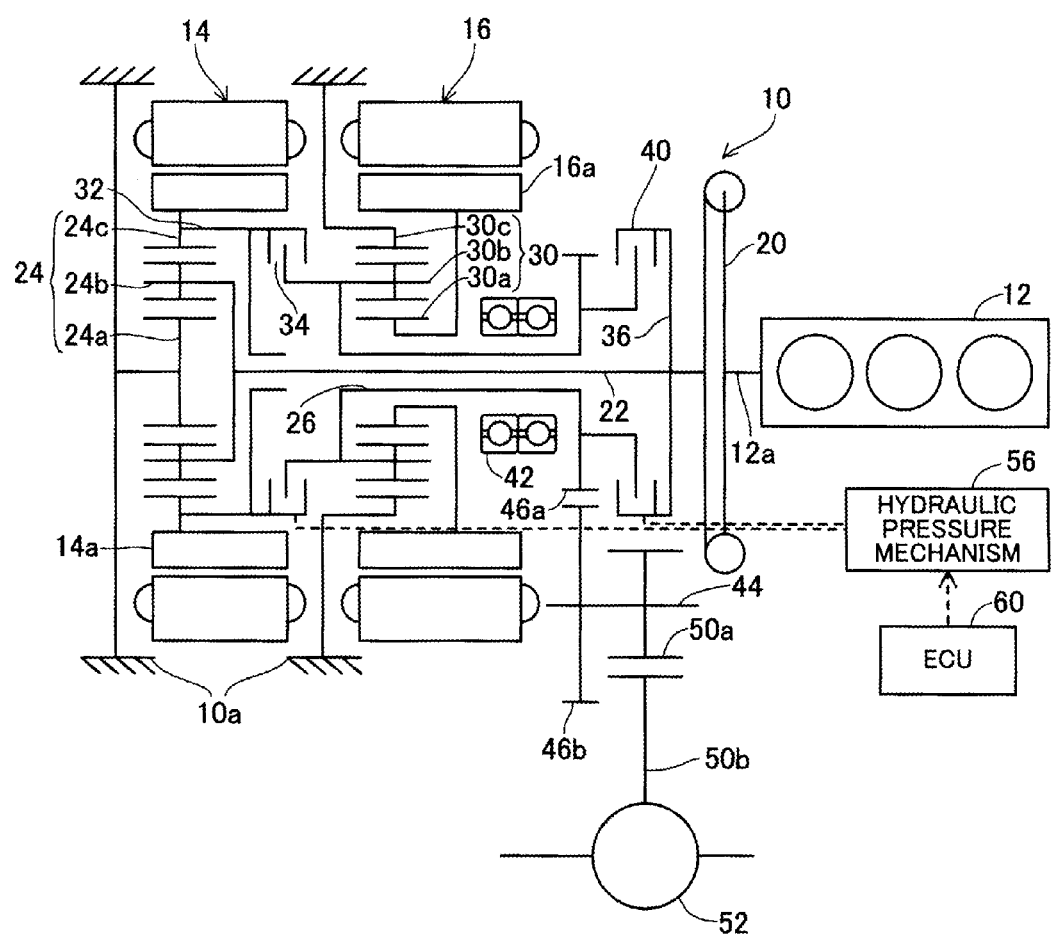
FIG. 1 is an overall skeleton view of a hybrid vehicle driving apparatus according to a first embodiment of this invention.
Figures 2, 3:
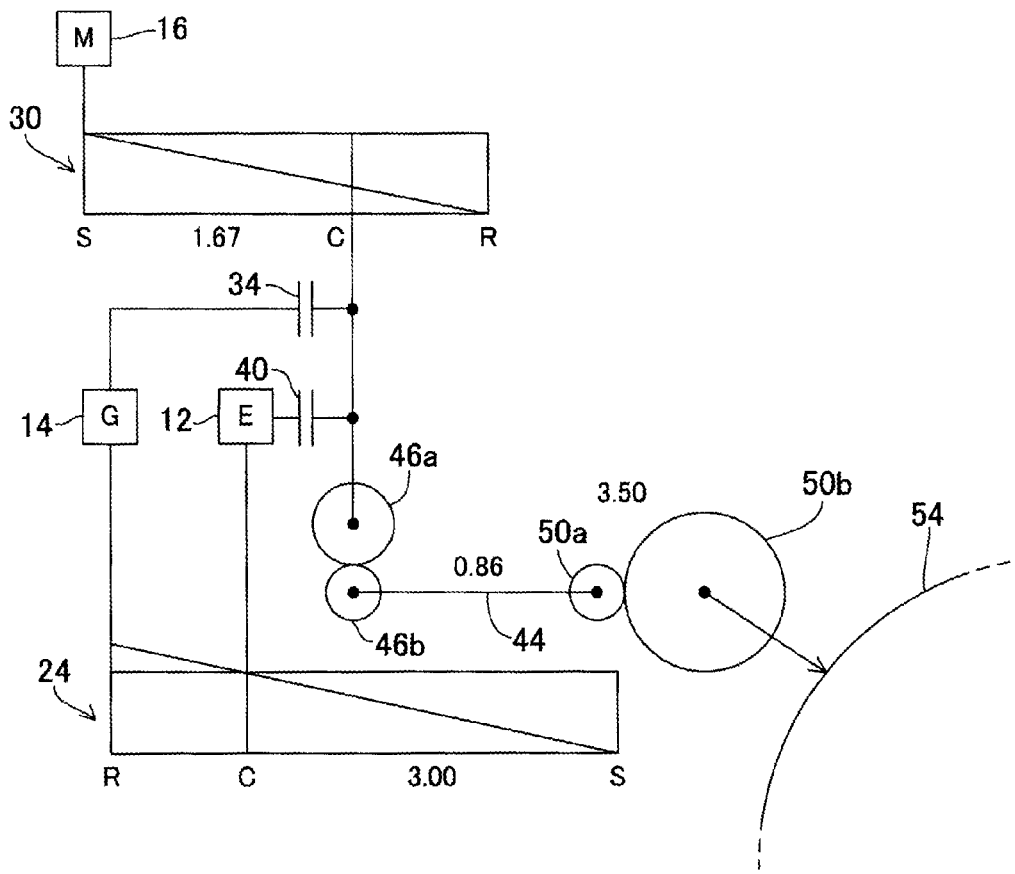
FIG. 2 is a velocity diagram of the apparatus shown in FIG. 1.
FIG. 3 is an explanatory view showing the operation of the apparatus shown in FIG. 1.

FIG. 1 is an overall skeleton view of a hybrid vehicle driving apparatus according to a first embodiment of this invention, FIG. 2 is a velocity diagram of the apparatus shown in FIG. 1 and FIG. 3 is an explanatory view showing the operation of the apparatus shown in FIG. 1.

First, the explanation will be made with focus on FIG. 1. Reference numeral 10 indicates the driving apparatus for a hybrid vehicle. The driving apparatus 10 includes an internal combustion engine 12, first electric rotating machine 14 and second electric rotating machine 16 and is mounted on a hybrid vehicle (not shown; hereinafter called the "vehicle").

The engine 12 has a spark-ignition, gasoline-fueled engine (or a compression-ignition diesel engine that runs on light oil), in which air-fuel mixture is ignited and burned to drive a piston (not shown).

The motion of the driven piston is transformed to the rotation of the crankshaft (not shown) and the output of the engine 12 outputted from its output shaft 12a connected to the crankshaft is inputted through a flywheel 20 (with a damper) and input shaft 22.

The first and second electric rotating machines 14, 16 comprise brushless AC synchronous motors. Upon being supplied with current, the rotating machines 14, 16 are rotated to function as electric motors and, upon being driven by the engine 12 (or wheels), they are rotated to function as generators.

Thus, the "electric rotating machine" in the embodiments represents a device that has both functions of the electric motor and generator. Electric energy generated by the first electric rotating machine 14 is stored in energy storing means (not shown) such as a battery while being supplied to the second electric rotating machine 16 as energy.

More specifically, in this embodiment, the first electric rotating machine 14 is driven by the engine 12 to mainly serve as the generator, while the second electric rotating machine 16 serves as the motor and generator.

The driving apparatus 10 further includes a speed increasing mechanism 24 that increases the output of the engine 12 in speed and transmits it to the first electric rotating machine 14, more precisely, a rotor 14a thereof, a speed reducing mechanism 30 that reduces an output of the second electric rotating machine 16, more precisely, the output outputted from a rotor 16a thereof and transmits it to an output shaft 26, a first clutch 34 that connects and disconnects a first driving force transmission path 32 coupling the speed increasing mechanism 24 and output shaft 26 (coaxial with the input shaft 22), and a second clutch 40 that connects and disconnects a second driving force transmission path 36 coupling the engine 12 and output shaft 26.

As illustrated, each of the speed increasing mechanism 24 and speed reducing mechanism 30 comprises a planetary gear mechanism and is installed at an inner periphery of each of the first and second electric rotating machines 14, 16.

The second electric rotating machine 16 is placed adjacent to the engine 12 with the speed reducing mechanism 30 installed at its inner periphery, while the first electric rotating machine 14 is placed adjacent to the second electric rotating machine 16 on the side far from the engine 12 (opposite side therefrom) with the speed increasing mechanism 24 installed at its inner periphery.

In the speed increasing mechanism 24 comprising the planetary gear mechanism, a sun gear 24a is connected to an apparatus housing (housing of the apparatus 10) 10a, a carrier 24b is connected to the engine 12 through the input shaft 22, and a ring gear 24c is connected to the first driving force transmission path 32.

In the speed reducing mechanism 30 similarly comprising the planetary gear mechanism, a sun gear 30a is connected to the second electric rotating machine 16 (more precisely, the rotor 16a thereof), a carrier 30b is connected to the output shaft 26, and a ring gear 30c is connected to the apparatus housing 10a.

The input shaft 22 and the output shaft 26 installed coaxially therewith are rotatably supported by a bearing 42, and a parallel shaft 44 is installed in parallel with the output shaft 26. An output drive gear 46a is fixed on the output shaft 26.

The parallel shaft 44 is fixed with an output driven gear 46b that meshes with the output drive gear 46a and has a smaller number of teeth than the output drive gear 46a. The parallel shaft 44 is also fixed with a final drive gear 50a.

A differential 52 is fixed with a final driven gear 50b that meshes with the final drive gear 50a and has a larger number of teeth than the final drive gear 50a.

The output of the final driven gear 50b is transmitted to a wheel (tire) 54 (FIG. 2) to make the vehicle run.

The first and second clutches 34, 40 comprise hydraulic multi-plate clutches. Pressing force is supplied (generated) to the clutches 34, 40 with the use of pressure (hydraulic pressure) of operating oil (oil) that is generated in a hydraulic pressure mechanism 56 and supplied and discharged through a hydraulic passage formed in the input shaft 22, i.e., in the shaft center thereof.

The hydraulic pressure mechanism 56 is connected to an Electronic Control Unit (ECU) 60. The ECU 60 including a microcomputer, etc., controls pressing force to be supplied to the first and second clutches 34, 40 by energizing and deenergizing electromagnetic solenoid valves (not shown) of the hydraulic pressure mechanism 56 so as to make the clutches 34, 40 ON (engaged) and OFF (disengaged).

When being supplied with hydraulic pressure, the first and second clutches 34, 40 are made ON (engaged) and connect the first and second driving force transmission paths 32, 36, i.e., transmit (connect) the driving force, while when hydraulic pressure is discharged, the clutches 34, 40 are made OFF (disengaged) and disconnect the first and second driving force transmission paths 32, 36, i.e., disconnect the transmission of the driving force, respectively.

Next, the operation of the apparatus 10 according to this embodiment will be explained with reference to FIGS. 2 and 3.

In this embodiment, the vehicle is started to move in a "series hybrid mode" shown in FIG. 3. In this mode, the ECU 60 makes both the first and second clutches 34, 40 OFF (disengaged) to transmit only the output of the second electric rotating machine (M) 16 to the wheel 54 so that the vehicle runs.

Specifically, the output of the second electric rotating machine 16 is inputted from the sun gear 30a of the speed reducing mechanism 30. The input is reduced in speed with the gear ratio of 1/1.67 (when the input is assumed to be 1) as shown in FIG. 2 and outputted from the carrier 30b to rotate the output shaft 26.

The rotation of the output shaft 26 is transmitted to the wheel 54 through the output gear 46 and final gear 50 so that the vehicle runs. At that time, an OA ratio (Over-All speed reduction ratio) is 8.04 ($\approx 1/(1/(1.67+1))\times 0.86\times 3.5$), as shown in FIG. 3.

Regardless of the ON/OFF status of the first and second clutches 34, 40, the output of the engine 12 is inputted to the carrier 24b of the speed increasing mechanism 24, where, as shown in FIG. 2, it is tripled in speed and then outputted from the ring gear 24c to rotate the rotor 14a of the first electric rotating machine 14, so that power is generated.

Thus, in this embodiment, the apparatus 10 is configured to be changeable in the gear ratio between high and low ratios, i.e., 1:3 and 1:1/1.67, through the first and second clutches 34, 40.

When the running speed of the vehicle is increased and has reached a middle speed range, the vehicle operation mode is changed to an "engine directly-connected Low mode" shown in FIG. 3. Specifically, the ECU 60 makes the first clutch 34 OFF and the second clutch 40 ON to connect the output of the engine 12 to the output shaft 26 through the second driving force transmission path 36, so that only the output of the engine 12 is transmitted to the wheel 54 and the vehicle runs accordingly.

In this case, the output of the engine 12 is transmitted through the second clutch 40, output shaft 26 and speed reducing mechanism 30 to the second electric rotating machine 16 to drive it, whereby the second electric rotating machine 16 functions as the generator. Since the first electric rotating machine 14 is also continuously driven by the engine 12, generated power of both of the first and second electric rotating machines 14, 16 is sent to the energy storing means.

At that time, the OA ratio is 3.01 ($=0.86\times 3.5$) as shown in FIG. 3.

When the running speed of the vehicle is further increased and has reached a high speed range, the vehicle operation mode is changed to an "engine directly-connected High mode" shown in FIG. 3. Specifically, the ECU 60 makes the first clutch 34 ON and the second clutch 40 OFF to connect the output of the engine 12 to the output shaft 26 through the first driving force transmission path 32, so that only the output of the engine 12 is transmitted to the wheel 54 and the vehicle runs accordingly.

In this case, the output of the engine 12 is transmitted to the output shaft 26 through the speed increasing mechanism 24. As a result, the OA ratio is 2.26 ($\approx 1/((1+3.0)/3.0))\times 0.86\times 3.5$) as shown in FIG. 3.

Since the first electric rotating machine 14 is also continuously driven by the engine 12 while the output of the speed increasing mechanism 24 is transmitted through the first driving force transmission path 32 and first clutch 34 to the second electric rotating machine 16 to drive it, generated power of both of the first and second electric rotating machines 14, 16 is sent to the energy storing means.

As set out in the foregoing, the first embodiment, is configured to have an apparatus 10 for driving a hybrid vehicle having an internal combustion engine 12 and first and second electric rotating machines 14, 16, comprising: a speed increasing mechanism 24 adapted to increase speed of an output of the engine 12 inputted through an input shaft 22 and transmit the output to the first electric rotating machine 14; a speed reducing mechanism 30 adapted to reduce speed of an output of the second electric rotating machine 16 and transmit the output to an output shaft 26; a first clutch 34 adapted to connect and disconnect a first driving force transmission path 32 coupling the speed increasing mechanism 24 and the output shaft 26; and a second clutch 40 adapted to connect and disconnect a second driving force transmission path 36 coupling the engine 12 and the output shaft 26. The gear ratio can be changed between two ratios through the first and second clutches 34, 40 so that the engine output can be converted to more appropriate driving force in accordance with the condition. Consequently, when the vehicle runs with the engine output, options of a series/parallel running mode that enables the vehicle to run with smaller loss in electric power than a series-hybrid running (in which the engine output is converted to electric energy and the converted energy is again converted to the driving force) can be increased. As a result, it becomes possible to enhance fuel efficiency of the engine 12.

Further, since the speed increasing mechanism 24 increasing the output of the engine 12 in speed and transmit it to the first electric rotating machine 14 is provided, it becomes possible to make the first electric rotating machine 14 light and compact. Furthermore, since the first clutch 34 connecting and disconnecting the first driving force transmission path 32 is provided, the rotation of the engine 12 in the high speed range can be suppressed, thereby further enhancing fuel efficiency.

Further, each of the speed increasing mechanism 24 and the speed reducing mechanism 30 comprises a planetary gear mechanism and installed in an inner periphery of each of the first electric rotating machine 14 and the second electric rotating machine 16. With this, in addition to the above effects, it becomes possible to make the apparatus 10 further lighter and more compact.

Further, the second electric rotating machine 16 is placed adjacent to the engine 12 with the speed reducing mechanism 30 installed at its inner periphery, while the first electric rotating machine 14 is placed adjacent to the second electric rotating machine 16 on a side far from the engine 12 with the speed increasing mechanism 24 installed at its inner periphery. Consequently, the side far from the engine 12 can be smaller than the engine 12 side, i.e., the apparatus 10 is shaped like an artillery shell. With this, in addition to the above effects, it becomes possible to improve the mountability of the apparatus 10 on the vehicle.

Further, the speed increasing mechanism 24 has a carrier 24b connected to the engine 12, a sun gear 24a connected to a housing (apparatus housing) 10a and a ring gear 24c connected to the first driving force transmission path 32, while the speed reducing mechanism 30 has a sun gear 30a connected to the second electric rotating machine 16, a ring gear 30c connected to the housing 10a and a carrier 30b connected to the output shaft 26, whereby the ring gear 24c of the speed increasing mechanism 24 and the carrier 30b of the speed reducing mechanism 30 are connected through the first clutch 34. Since the first and second electric rotating machines 14, 16, speed increasing mechanism 24, speed reducing mechanism 30 and first and second clutches 34, 40 can be arranged coaxially with the input shaft 22 that transmits the input from the engine 12 to the carrier 24b of the speed increasing mechanism 24, in addition to the above effects, it becomes possible to shorten the length in the axial direction.

Second Embodiment

Figure 4:
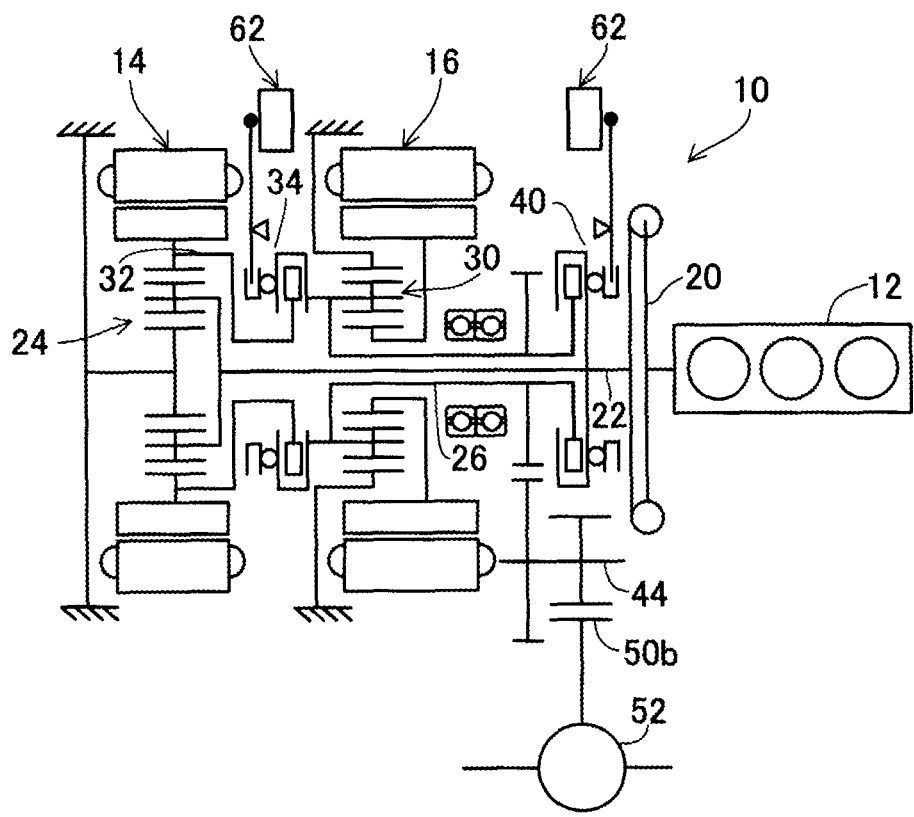
FIG. 4 is an overall skeleton view of a hybrid vehicle driving apparatus according to a second embodiment of this invention.

FIG. 4 is an overall skeleton view similar to FIG. 1, but showing a hybrid vehicle driving apparatus 10 according to a second embodiment of this invention. Note that constituent elements corresponding to those of the first embodiment are assigned by the same reference symbols as those in the first embodiment and will not be explained.

The explanation will be made with focus on points of difference from the first embodiment. In the second embodiment, the first and second clutches 34, 40 are supplied with pressing force from the exterior of the input shaft 22, more exactly, through a clutch actuator 62 installed in the exterior of the input shaft 22.

The clutch actuator 62 comprises, for instance, a mechanical frictional clutch, and is housed in the apparatus housing 10a and not surrounded by any other component. The clutch actuator 62 is operable by the ECU 60.

As set out in the foregoing, in the second embodiment, similarly to the first embodiment, the output of the engine 12 is inputted through the input shaft 22 and the first and second clutches 34, 40 are supplied with pressing force from exterior of the input shaft 22. With this, in addition to the above effects, it becomes possible to further enhance fuel efficiency of the engine 12.

To be more specific, pressing force of this kind of clutch is generally generated with the use of pressure (hydraulic pressure) of operating oil supplied from the shaft center of the input shaft 22. In such configuration, since the operating oil is consumed at the hydraulic passage (such as leakage at a seal ring, etc.) and it means that wasted energy exists at a hydraulic pump, it deteriorates fuel efficiency.

However, since the second embodiment is configured to supply pressing force to the first and second clutches 34, 40 from the exterior of the input shaft 22, it becomes possible to reduce consumption of the operating oil, in other words, to employ the structure not using hydraulic pressure. Therefore, fuel efficiency of the engine 12 can be further enhanced. The remaining configuration is the same as that in the first embodiment.

Third Embodiment

Figure 5:
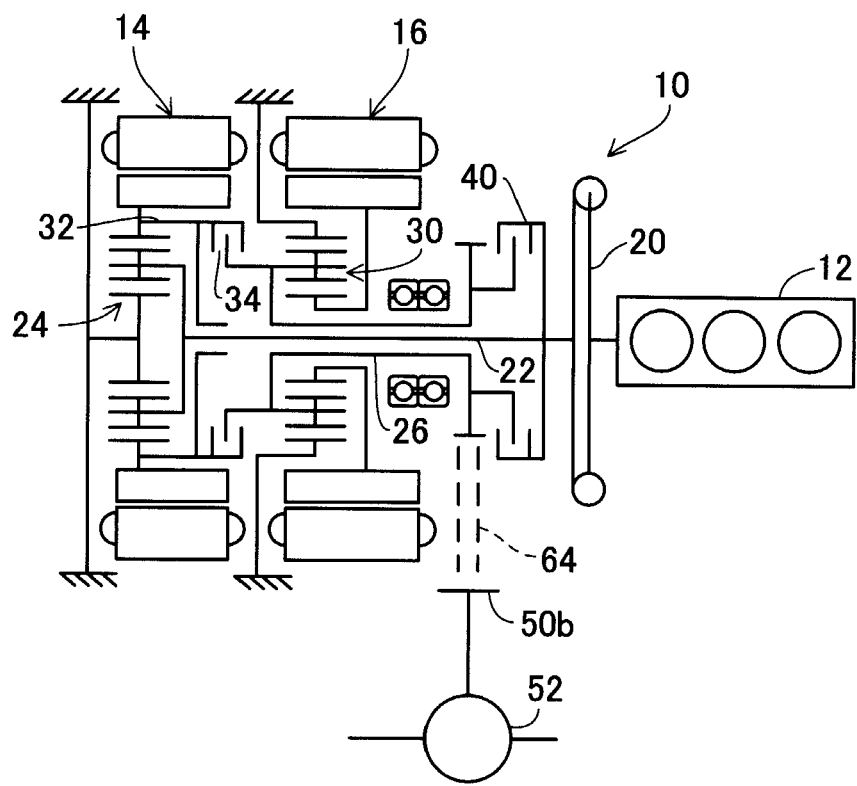
FIG. 5 is an overall skeleton view of a hybrid vehicle driving apparatus according to a third embodiment of this invention.

FIG. 5 is an overall skeleton view similar to FIG. 1, but showing a hybrid vehicle driving apparatus according to a third embodiment of this invention. Note that constituent elements corresponding to those of the first embodiment are assigned by the same reference symbols as those in the first embodiment and will not be explained.

The explanation will be made with focus on points of difference from the first embodiment. In the third embodiment, the parallel shaft 44 is removed while the output drive gear 46a is connected to the final driven gear 50b through a chain 64. The remaining configuration is the same as that in the first embodiment.

It should be noted that the connection with the inputs and outputs of the planetary gear mechanisms constituting the speed increasing mechanism 24 and speed reducing mechanism 30 stated in the foregoing is one example and it is not limited thereto.

INDUSTRIAL APPLICABILITY

According to this invention, in a driving apparatus for a hybrid vehicle having an internal combustion engine and first and second electric rotating machines, it is configured to have a speed increasing mechanism adapted to increase speed of an output of the engine inputted through an input shaft and transmit it to the first electric rotating machine; a speed reducing mechanism adapted to reduce speed of an output of the second electric rotating machine and transmit it to an output shaft; a first clutch adapted to connect and disconnect a first driving force transmission path coupling the speed increasing mechanism and the output shaft; and a second clutch adapted to connect and disconnect a second driving force transmission path coupling the engine and the output shaft. The gear ratio can be changed between two ratios through the first and second clutches so that the engine output can be converted to more appropriate driving force. Consequently, when the vehicle runs with the engine output, options of a series/parallel running mode that enables the vehicle to run with smaller loss in electric power than a series-hybrid running (in which the engine output is converted to electric energy and the converted energy is again converted to the driving force) can be increased, thereby enabling to enhance fuel efficiency of the engine.

DESCRIPTION OF SYMBOLS

10 Hybrid vehicle driving apparatus, 12 Internal combustion engine, 14 First electric rotating machine, 16 Second electric rotating machine, 22 Input shaft, 24 Speed increasing mechanism (planetary gear mechanism), 24a Sun gear, 24b Carrier, 24c Ring gear, 26 Output shaft, 30 Speed reducing mechanism (planetary gear mechanism), 30a Sun gear, 30b Carrier, 30c Ring gear, 32 First driving force transmission path, 34 First clutch, 36 Second driving force transmission path, 40 Second clutch, 44 Parallel shaft, 46 Output gear, 50 Final gear, 54 Wheel, 56 Hydraulic pressure mechanism, 60 ECU (Electronic Control Unit), 62 Clutch actuator, 64 Chain

The invention claimed is:

1. An apparatus for driving a hybrid vehicle having an internal combustion engine and first and second electric rotating machines, comprising:
 a speed increasing mechanism comprising a first planetary gear mechanism and adapted to increase speed of an output of the engine inputted through an input shaft and transmit output to the first electric rotating machine;
 a speed reducing mechanism comprising a second planetary gear mechanism and adapted to reduce speed of an output of the second electric rotating machine and transmit output to an output shaft;
 a carrier of the speed increasing mechanism connected in a state incapable of relative rotation to the output of the engine;
 a sun gear of the speed increasing mechanism fixed at a housing;
 a ring gear of the speed increasing mechanism connected in a state incapable of relative rotation to an output of the first electric rotating machine;
 a carrier of the speed reducing mechanism connected the output shaft;
 a sun gear of the speed reducing mechanism connected in a state incapable of relative rotation to the output of the second electric rotating machine;
 a ring gear of the second speed reducing mechanism connected to the housing;
 a first clutch adapted to connect the ring gear of the speed increasing mechanism and the output shaft; and
 a second clutch adapted to connect the engine and the output shaft directly.

2. The apparatus according to claim 1, wherein each of the speed increasing mechanism and the speed reducing mechanism is installed in an inner periphery of each of the first electric rotating machine and the second electric rotating machine.

3. The apparatus according to claim 2, wherein the second electric rotating machine is placed adjacent to the engine with the speed reducing mechanism installed at its inner periphery, while the first rotating machine is placed adjacent to the second electric rotating machine on a side far from the engine with the speed increasing mechanism installed at its inner periphery.

4. The apparatus according to claim 1, wherein the output of the engine is inputted through the input shaft and the first and second clutches are supplied with pressing force from exterior of the input shaft.

* * * * *